(12) United States Patent
Story, Jr. et al.

(10) Patent No.: US 8,914,386 B1
(45) Date of Patent: Dec. 16, 2014

(54) SYSTEMS AND METHODS FOR DETERMINING RELATIONSHIPS BETWEEN STORIES

(75) Inventors: Guy A. Story, Jr., New York, NY (US); Steven Dzik, Somerset, NJ (US)

(73) Assignee: Audible, Inc., Newark, NJ (US)

( * ) Notice: Subject to any disclaimer, the term of this patent is extended or adjusted under 35 U.S.C. 154(b) by 580 days.

(21) Appl. No.: 12/881,053

(22) Filed: Sep. 13, 2010

(51) Int. Cl.
  *G06F 17/30* (2006.01)
  *G06F 15/16* (2006.01)

(52) U.S. Cl.
  USPC ............................ 707/752; 715/716; 345/901

(58) Field of Classification Search
  USPC ........................................ 707/752, 912, 913
  See application file for complete search history.

(56) References Cited

U.S. PATENT DOCUMENTS

| | | | |
|---|---|---|---|
| 2002/0198905 A1 | 12/2002 | Tabatabai et al. | |
| 2005/0022113 A1* | 1/2005 | Hanlon | 715/511 |
| 2005/0069849 A1 | 3/2005 | McKinney et al. | |
| 2006/0141436 A1* | 6/2006 | Rines | 434/318 |
| 2006/0286528 A1* | 12/2006 | Harshman | 434/317 |
| 2008/0021894 A1* | 1/2008 | Styles | 707/5 |
| 2008/0092077 A1 | 4/2008 | Mather et al. | |
| 2009/0228788 A1 | 9/2009 | Audet | |
| 2010/0094879 A1 | 4/2010 | Donnelly et al. | |
| 2010/0241962 A1* | 9/2010 | Peterson et al. | 715/720 |
| 2010/0281034 A1* | 11/2010 | Petrou et al. | 707/748 |

* cited by examiner

*Primary Examiner* — Alex Gofman
(74) *Attorney, Agent, or Firm* — Knobbe, Martens, Olson & Bear, LLP

(57) ABSTRACT

Systems and methods are provided for displaying relationships between stories. In some embodiments, a plurality of referents that are each related to a first story may be caused to be displayed, where a referent is at least one of an event, a character, an object, a subject, a time, a place and a person. A user may be enabled to select one of the plurality of referents in order to view identification information identifying at least one other story, where the other story is also associated with the selected referent. In response to user selection of one of the plurality of referents, identification information identifying the at least one other story that is associated with the selected referent may be caused to be displayed.

21 Claims, 8 Drawing Sheets

SYSTEMS AND METHODS FOR DETERMINING RELATIONSHIPS BETWEEN STORIES

BACKGROUND

Books, movies, audio books, and other forms of storytelling often include in their narratives a wide range of characters, themes, subject matter, events, etc. A reader, viewer, listener, or other consumer of these narratives may enjoy a particular narrative or story for a variety of reasons, including one or more of the characters, themes, subject matter, and/or events referenced in the narrative. Two or more stories may have references in common. For example, two stories may each be set in the same time period and location, include the same historical person or fictional character, and/or relate to similar subject matter. Typically, a reader, viewer or other consumer who enjoys a particular story is not able to quickly explore or learn of similar stories based on the aspect of the story that they enjoyed, such as a particular character, time period, place or subject.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
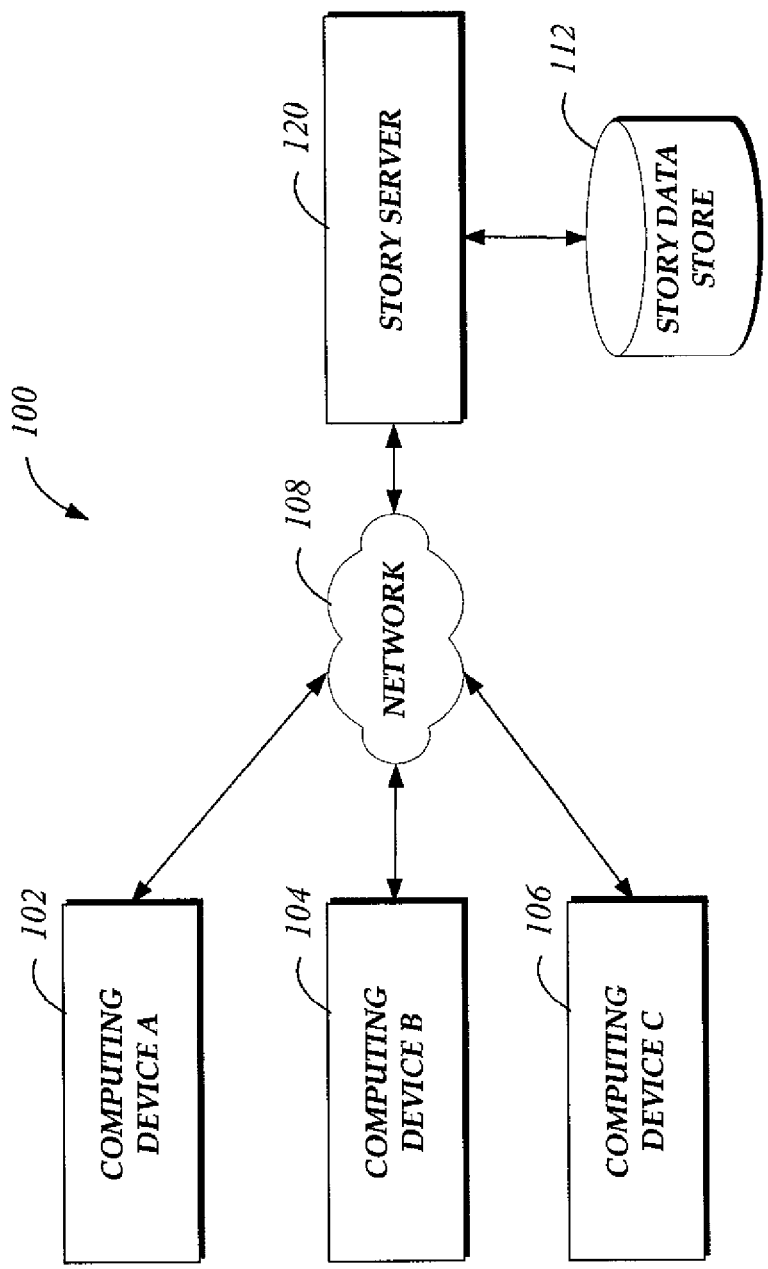
FIG. 1 is a block diagram depicting an illustrative operating environment in which a user of a computing device may create and/or view associations between stories and referents.

Generally described, aspects of the present disclosure relate to determining associations between stories and referents, and enabling users to explore or navigate between stories and/or referents based on these associations. For example, aspects of the present disclosure enable a user to select a point in a story in order to associate that point in the story with a referent related to the story, such as a referent referenced in or related to the content of the story at the given point. A referent may generally be anything referred to by a story, such as a place, object, real person, fictional character, concept, subject, event, time, and/or visual or mental image. Based on the associations between stories and referents described herein, a user may explore stories or versions of stories by navigating between stories and/or referents based on one or more referents of interest to the user.

As used herein, a "story" may generally refer to any narrative, such as a narrative depiction of an act, occurrence and/or course of events, whether or not in chronological order or any other type of sequence. A story may be fictional, nonfictional, or a mixture of both. A story or narrative may be embodied in some medium, such as text, audio, images, and/or video. A given embodiment of a story may be referred to herein as a "version" of the story. For example, a given story may be embodied in one or more book versions, one or more movie versions, one or more audio book versions, one or more poem versions, etc. These different versions of a particular story may differ in medium and/or in details of the narrative itself. A "story" may also be referred to herein as a "work."

In some embodiments, a story server as disclosed herein may generate one or more user interfaces or other input mechanisms to enable a user to associate a story with one or more referents. For example, the story server may cause display of information representing a first version of a story, and in the display of information representing the first version of the story, a user may be enabled to associate a referent with a first point in the first version of the story, where the referent is at least one of an event, a character, an object, a subject, a time, a place and a person. In some embodiments, the story server may then automatically associate the referent with a second point in a second version of the story based at least in part on a point or position map associated with the first version of the story and the second version of the story. The point map may relate each of a plurality of points in the first version with a point in the second version.

In some embodiments, a story server as disclosed herein may cause display of relationships between different stories and/or referents. For example, the story server may cause display of: (1) identification information identifying a first story, and (2) referents that are each related to a point in the first story, where each of the referents is at least one of an event, a character, an object, a subject, a time, a place and a person. The story server may enable a user to select one of the referents in order to view identification information identifying at least one other story that is also associated with the selected referent. In response to user selection of one of the referents, the story server may cause display of (1) identification information identifying the at least one other story that is associated with the selected referent, and optionally (2) a point in the other story that is related to the selected referent.

FIG. 1 depicts an illustrative operating environment in which a user of a computing device may create and/or view associations between stories and referents. The depicted environment includes computing devices 102, 104 and 106, and a story server 120 communicatively connected by a network 108, such as the Internet. Those skilled in the art will recognize that each of computing devices 102, 104 and 106 may be any of a number of computing devices that are capable of communicating over a network including, but not limited to, a laptop, personal computer, personal digital assistant (PDA), hybrid PDA/mobile phone, mobile phone, electronic book reader, digital media player, and the like. In some embodiments, the story server 120 may provide front-end communication with various user devices, such as computing devices 102, 104 and 106, via network 108. The front-end communication provided by the story server 120 may include generating text and/or graphics, possibly organized as a user interface using hypertext transfer or other protocols in response to information inquiries received from the various user devices.

The story server 120, which will be described below in more detail, may be connected to or in communication with a story data store 112. Those skilled in the art will appreciate that the story data store 112 may be local to the story server 120, may be remote to the story server 120, and/or may be a network-based service itself. Those skilled in the art will appreciate that the network 108 may be any wired network, wireless network or combination thereof. In addition, the network 108 may be a personal area network, local area network, wide area network, cable network, satellite network, cellular telephone network, etc., or combination thereof. Protocols and components for communicating via the Internet or any of the other aforementioned types of communication networks are well known to those skilled in the art of computer communications and, thus, need not be described in more detail herein.

The system 100 is depicted in FIG. 1 as operating in a distributed computer environment comprising several computer systems that are interconnected using one or more computer networks. The system 100 could also operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components and peer-to-peer network configurations to implement at least a portion of the processes.

Though not illustrated in FIG. 1, in some embodiments, the environment may also include a retail server that facilitates electronic browsing and purchasing of goods and services using various user devices, such as computing devices 102, 104 and 106. For example, a retail server may obtain information on available goods and services (or "items") from one or more data stores (not illustrated), as is done in conventional electronic commerce systems. Items may include, for example, versions of stories that are available for purchase, such as books, audio books, movies, etc. In other embodiments, the story server 120 may access item data from the story data store 112 and/or other data sources, either internal or external to system 100.

Figure 2:
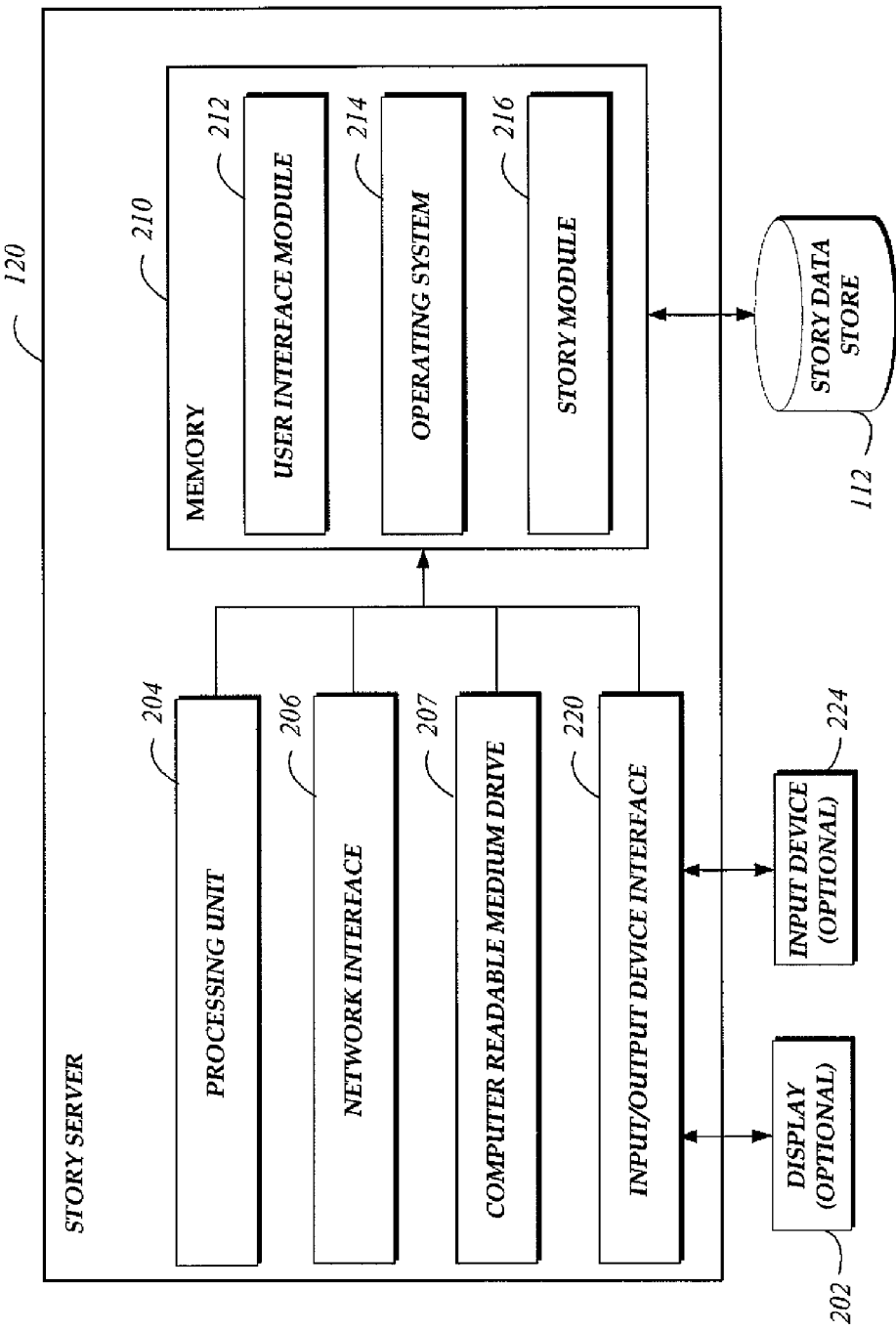
FIG. 2 depicts a general architecture of a story server for determining associations between stories and referents, and for causing display of associations between stories and referents.

FIG. 2 depicts a general architecture of a story server 120 for determining associations between stories and referents, and for causing display of associations between stories and referents. The general architecture of the story server 120 depicted in FIG. 2 includes an arrangement of computer hardware and software components that may be used to implement aspects of the present disclosure. Those skilled in the art will appreciate that the story server 120 may include many more (or fewer) components than those shown in FIG. 2. It is not necessary, however, that all of these generally conventional components be shown in order to provide an enabling disclosure. As illustrated in FIG. 2, the story server 120 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from an optional input device 224, such as a keyboard, mouse, digital pen, etc.

The memory 210 contains computer program instructions that the processing unit 204 executes in order to implement one or more embodiments. The memory 210 generally includes RAM, ROM and/or other persistent, non-transient memory. The memory 210 may store an operating system 214 that provides computer program instructions for use by the processing unit 204 in the general administration and operation of the story server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with an auxiliary story data store 112. Data stored in the story data store 112 may include information associated with stories and their various versions (such as title, publisher, year of publication, etc.); story content, (such as text of a book, audio of an audio book, a digital copy of a movie, etc.); and/or referents associated with stories.

In addition to the user interface module 212, the memory 210 may include a story module 216 that may be executed by the processing unit 204. In one embodiment, the story module 216 implements various aspects of the present disclosure, e.g., associating a point in a story with a referent, determining stories related to a referent, etc., as described further below. While the story module 216 is shown in FIG. 2 as part of the story server 120, in other embodiments, all or a portion of a story module may be a part of a user's computing device, such as computing device 102. For example, in certain embodiments of the present disclosure, each of computing devices 102, 104 and/or 106 may include several components that operate similarly to the components illustrated as part of the story server 120, including a user interface module, story module, processing unit, computer readable medium drive, etc. In such embodiments, the computing device 102 may communicate with a story data store, such as story data store 112.

Figure 3:
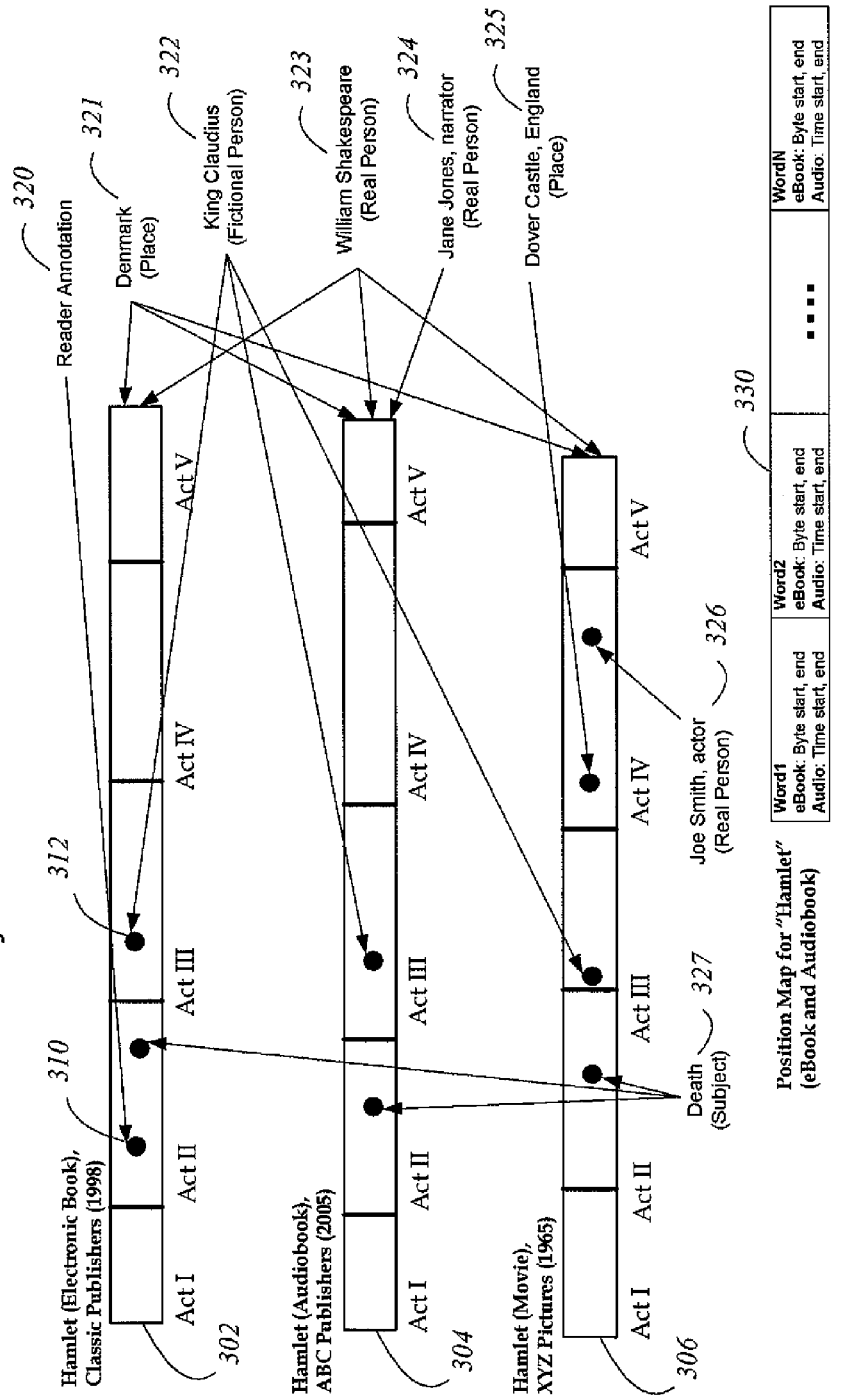
FIG. 3 includes an illustrative graphical representation or visualization of associations between versions of a story and various referents, as well as a graphical representation of a position map that associates positions in one version of the story with positions in another version of the story.

FIG. 3 includes an illustrative graphical representation or visualization of associations between versions of a story and various referents, as well as a graphical representation of a position map 330 that associates positions or points in one version of the story with positions or points in another version of the story. Each of storylines 302, 304 and 306 correspond to different versions of the same story, "Hamlet." For example, the Hamlet story may be thought of as a narrative that exists independently of any specific binding, embodiment or version of the story. The story of "Hamlet" may, for example, be thought of as a narrative written by Shakespeare, originally as a play to be performed, that is associated with a certain general narrative regardless of the specific wording, performance, or other details of a given version or embodiment of the story. The "Hamlet" story may be embodied in a large number of different versions, including the three versions identified in FIG. 3 as associated with the three storylines 302, 304 and 306. As illustrated, storyline 302 corresponds to a particular electronic book version of Hamlet, identified as published by Classic Publishers in 1998. Storyline 304 corresponds to a particular audio book version of Hamlet, identified as published by ABC Publishers in 2005. Storyline 306 corresponds to a movie version of Hamlet, identified as a movie produced by XYZ Pictures in 1965. As will be appreciated, other versions of Hamlet may exist in a variety of version types not illustrated in FIG. 3, such as theatrical performances, abridged text or audio versions, translated text or audio versions, etc.

A graphical representation of a storyline, such as storylines 302, 304 and 306, may generally be considered to graphically represent a story or version of a story as a set of points in narrative order. The narrative order of a point relative to another point may be based on the order that the two points appear in the narrative, which may or may not correspond to the chronological order of events described at the given points in the narrative. For example, a given story may describe an action of an adult character at a first point in the narrative, then in a later point in the narrative describe a formative event of that character's childhood. In that case, a storyline representation may include the first point prior to the second point (which is the order in which the points appear in the narrative), rather than in the chronological order that the events occurred in the character's life.

In some embodiments, an alternative or additional representation of a story or version of a story may represent points of the narrative in chronological order (not illustrated in FIG. 3). A chronologically ordered representation of events in a story or version of a story may be considered a "timeline" of the story or version of the story. A timeline may include events in a story for which a chronological order or relationship can be determined between the events, such as may be determined by a user based on a reading or other exposure to the story. The chronological order, or "before and after" relationship, between different events within a story may be represented as a timeline in a variety of formats or data structures, such as a directed graph of two or more events described in the story. In some embodiments, a timeline may be shared among multiple versions of a story, or between multiple stories, if a time relationship can be determined between events in the different versions or stories. As will be appreciated, many of the aspects of the present disclosure which relate to creating or viewing associations between points in a storyline representation and referents related to particular points in the storyline representation may be equally applicable to creating or viewing associations between a timeline representation and referents related to particular points in the timeline representation.

While FIG. 3 illustrates graphical representations of storylines 302, 304 and 306 that are each associated with a different version of the Hamlet story, in other embodiments, a single storyline representation may be shared between two or more versions of a story, or between all versions of a story. For example, a storyline representation shared by all versions of a story may include the points which all versions have in common. In other embodiments, a storyline representation shared by multiple versions of a story may include all points which occur in at least one version of the story.

As illustrated in FIG. 3, each of referents 320-327 is associated with at least one of storylines 302, 304 and 306. For example, referent 320, a reader annotation, is associated with point 310 in storyline 302, which corresponds to an electronic book version of Hamlet. Referent 320 may have been associated with point 310, for example, by a user reading an electronic book version of Hamlet (such as by using an electronic book reader or other computing device) and selecting to add an annotation or note to a certain portion of the text. For example, the reader annotation may include text typed by the user that provides a note regarding a given portion of text in the electronic book, explains a scene described in the given portion of text, and/or provides other information related to the given portion of text. In some embodiments, the reader annotation may include images or other content. For example, the reader may provide a sketch or image associated with the given portion of text. The reader annotation may have been received by the story server 120, such as via network 108, and associated with the corresponding point in storyline 302.

Referent 321 is of the referent type "Place," and represents Denmark in the illustrated Hamlet example. As illustrated in FIG. 3, the Denmark referent has been generally associated with each of storylines 302, 304, 306, but has not been associated with any individual points in the storylines. For example, Denmark may have been associated with each of the versions of Hamlet based on a user indicating that Denmark should be associated with the story Hamlet in general, including all versions of the story or a certain subset of the versions of the story. Referent 322 is of the referent type "Fictional Person," and represents the character "King Claudius." As illustrated, "King Claudius" referent 322 has been associated with point 312 in storyline 302, as well as similar points in storylines 304 and 306. "King Claudius" may have been associated with point 312 in storyline 302, for example, based on a user indicating the association through a user interface, such as a user interface similar to that described below in reference to FIG. 6. Story server 120 may have then automatically associated the King Claudius referent 322 with points in storylines corresponding to other versions of Hamlet, such as storylines 304 and 306, based on one or more position maps, such as position map 330. While referent 322 is illustrated as being associated with a single point 312 in storyline 302, in some embodiments, a single referent may be associated with multiple points in a story or version of a story. For example, a fictional person referent, such as the King Claudius referent 322, may be associated with two or more points in a storyline, where each point may correspond to content in which the fictional person is referenced. In some embodiments, the various points in a story with which a given referent is associated may be thought of as intra-referents within or between points in the same story.

A position map, which may also be considered a "point map," may associate positions or points in one version of a story with positions or points in one or more other versions of the story. As illustrated, position map representation 330 associates positions in the electronic book version of Hamlet (which is associated with storyline 302) and the audio book version of Hamlet (which is associated with storyline 304). For example, the electronic book version of Hamlet and the audio book version of Hamlet may be based on the same underlying content or text, with the audio book version consisting of an audio recording of a narrator reading the text of the electronic book version. The position map 330 may relate the position of each word in the electronic book version with the position of the same corresponding word in the audio book version. In some embodiments, the entries in position map 330 may have been automatically determined by the story server 120 based on a comparison of the content of the different versions of the Hamlet story. As illustrated, each word entry in position map 330 includes a byte starting point and byte ending point of the given word's location in a file corresponding to the electronic book version, as well as a time starting point and time ending point of the given word's location in the audio recording corresponding to the audio book version. As will be appreciated, a variety of information may be used to indicate a location in a version of a story, such as byte information, time information, page and/or line number information, and/or other invariant reference points. The type of information used by the story server to indicate a point or location in a version of a story may vary based at least in part on the format of a given version of the story (for example, whether an electronic copy of the version's content is accessible to the story server, whether the content includes audio and/or video, etc.). While position map 330 relates the electronic book version and audio book version at the word level, in other embodiments, the points or locations in a version of a story may be indicated at different levels of particularity, such as by page, sentence, line, paragraph, coordinates, act, scene, beat, chapter, frame, time, etc., and/or a combination thereof. In some embodiments, a user may specify a level of particularity (for example, word level, paragraph level, chapter level, etc.) to be displayed and/or with which to associate a referent.

In some embodiments, a position map may not be determined for the pairing of the electronic book version of Hamlet (which is associated with storyline 302) and the movie version of Hamlet (which is associated with storyline 306). For example, the movie version may be generally based on the underlying Hamlet story, but not match the content of the electronic book version or audio book version at a word level. For example, the movie version and the electronic book version may share many referents, but may have certain referents that are only associated with one version or a subset of the versions of a story. As illustrated, storyline 302 and storyline 306 may be generally similar, but not similar to the extent that they may be precisely correlated at the word level. However, portions of the imperfectly correlated versions may match word-for-word, in which case one or more partial position maps may be determined by the story server 120 for certain scenes, chapters, or other portions of content shared between the versions.

FIG. 3 additionally includes referents 323-327. Referent 323 is of the referent type "Real Person," and represents William Shakespeare. The story server 120 may have associated referent 323 with one or more versions of Hamlet based user indications, and/or based on author information associated with the Hamlet story or versions of the Hamlet story. Referent 324 is of the referent type "Real Person," and represents "Jane Jones," a narrator. The story server 120 may have associated referent 324 with an audio book version of Hamlet based on narrator information associated with the audio book (e.g., that a narrator named Jane Jones recorded the narration audio for the audio book). Referent 325 is of the referent type "Place," and represents Dover Castle in England. A user may have indicated that "Dover Castle" should be associated with a point in storyline 306 corresponding to a movie version of Hamlet based on, for example, a scene at that point in the movie being filmed at Dover Castle. Referent 326 is of the referent type "Real Person," and represents actor Joe Smith. A user may have indicated that "Joe Smith" should be associated with a point in storyline 306 corresponding to a movie version of Hamlet based on, for example, an actor named Joe Smith appearing in the movie at that point. Referent 327 is of the referent type "Subject," and represents the general subject matter of death. A user may have indicated that "Death" should be associated with a point in one or more of storylines 302, 304 and 306 based on, for example, a point in the content of the corresponding version of Hamlet referencing death, either in terms of a specific death or death as a general subject. In some embodiments, the story server 120 may have automatically associated referent 327 with other versions of Hamlet based on position map 330.

Figure 4:
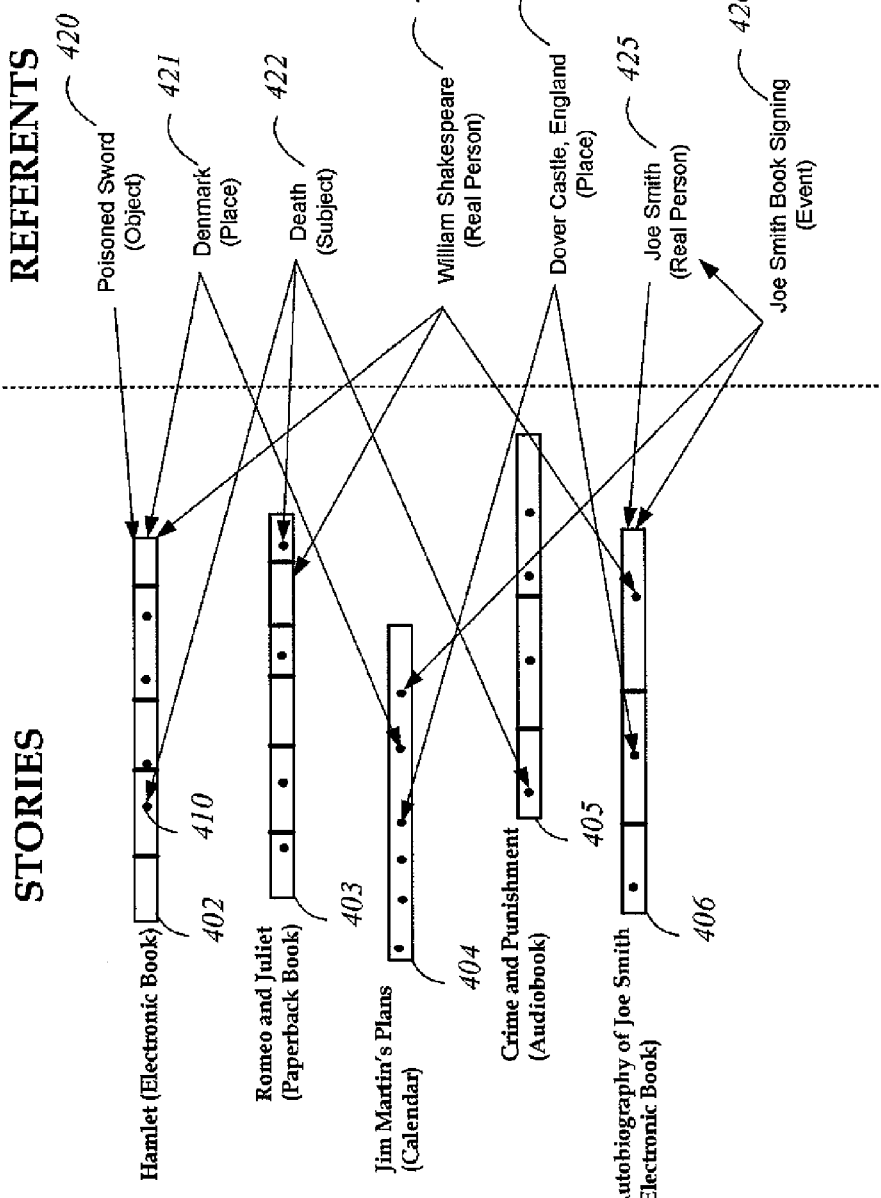
FIG. 4 is an illustrative graphical representation or visualization of associations between stories and referents.

FIG. 4 is an illustrative graphical representation or visualization of associations between stories (or particular versions of stories) and referents. As illustrated, storylines 402-406 are each associated with one or more of referents 420-426. The associations may have been determined by the story server 120 and stored in one or more data stores, such as story data store 112. The story versions illustrated in FIG. 4 include an electronic book version storyline 402 corresponding to "Hamlet," a paperback book version storyline 403 corresponding to "Romeo and Juliet," a personal calendar 404 corresponding to "Jim Martin's Plans," an audio book version storyline 405 corresponding to "Crime and Punishment," and an electronic book version storyline 406 corresponding to "Autobiography of Joe Smith." While each of storylines 402-406 is indicated as corresponding to a version or type of "story" in FIG. 4, in some embodiments, a personal calendar, such as "Jim Martin's Plans," may not be considered a story or version of a story in a traditional sense, but may nonetheless be associated with referents in a similar manner as stories or versions of stories may be associated with referents. For example, a calendar may be considered to consist of points in a similar manner as a storyline, where each point may be associated with one or more referents. Thus, for purposes of the present disclosure a story may include a calendar or any other type of work consisting of points, where each point may be associated with one or more referents.

As illustrated in FIG. 4, subject referent 422, "death," is associated with point 410 in storyline 402, as well as a point in storyline 403 (corresponding to "Romeo and Juliet") and a point in storyline 405 (corresponding to "Crime and Punishment"). As will be discussed further below, the story server 120 may enable a user to explore associations between stories and referents, such as by beginning at a user interface associated with the "Hamlet" electronic book and selecting to view information identifying other stories that are associated with the subject of "death." In response, the story server may present for display one or more user interfaces that include information associated with "Romeo and Juliet" and/or "Crime and Punishment," based on the "death" referent 422 being associated with each of these stories (or with at least one version of each of these stories). Though not illustrated in FIG. 4, one or more of referents 420-426 may be associated with other stories not illustrated, or other versions of the stories corresponding to storylines 402-406, such as via one or more position maps (as discussed above in reference to FIG. 3).

FIG. 4 includes object referent 420 corresponding to a "poisoned sword." This referent may be associated with storyline 402 based on, for example, a user indicating that a poisoned sword is referenced in the content of the "Hamlet" story, perhaps because a character uses a poisoned sword in the story. FIG. 4 also includes five referents previously described in reference to FIG. 3 above: place referent 421 corresponding to "Denmark," subject referent 422 corresponding to "death," real person referent 423 corresponding to "William Shakespeare," place referent 424 corresponding to "Dover Castle, England," and real person referent 425 corresponding to "Joe Smith." As illustrated, each of these previously discussed referents is associated with stories other than Hamlet, which was the only story described in reference to these referents in FIG. 3. For example, actor Joe Smith, previously discussed as associated with a point in which the actor appeared in a movie version of Hamlet, is indicated as also associated with a non-fiction electronic book storyline 406. Place referent 424 corresponding to Dover Caster in England is associated with a personal calendar 404 corresponding to "Jim Martin's Plans." Jim Martin may be, for example, a user of the story server 120, and may have an electronic calendar accessible by the story server that includes a point at which Jim Martin visited or plans to visit Dover Castle in England. Calendar 404 is also associated with event referent 426 corresponding to "Joe Smith Book Signing." This association may indicate, for example, that Jim Martin plans to or did attend a book signing event by actor Joe Smith. Event referent 426 corresponding to "Joe Smith Book Signing" is also associated with storyline 406 (corresponding to the "Autobiography of Joe Smith"), which may be associated with referent 426 because the book signing event may be a book signing event for the "Autobiography of Joe Smith." Though not illustrated, event referent 426, as well as other event referents (such as an event referent corresponding to a historic event), may be associated with date and/or time in a general calendar or timeline of events stored in story data store 112. As illustrated, event referent 426 is also associated with real person referent 425, Joe Smith. Thus, in some embodiments, a referent may be associated with other referents.

While a variety of referent types have been described above in reference to FIGS. 3 and 4, referents may be of other types than those illustrated. For example, referent types may include a passage of music, such as a particular piece of music or portion of music referred to in a story or that enhances a story. A passage of music referent may be associated with an actual recording of the music, and/or may include information regarding the instruments that are played in the music, the composer, the musical structures, etc. In some embodiments, display of a passage of music referent may include a selectable option which a user may select in order to listen to a recording of the music while the user reads or otherwise consumes the associated story content. For example, if characters in a portion of a story are described as being at a particular opera, a selectable option may enable a reader to listen to a sound recording of a performance of the referenced opera. Referent types may additionally or alternatively include user-generated content of various types, such as customer reviews and/or ratings associated with a story or a version of a story, a bookmark created by a user for a given version of a story (such as an electronic book), etc. In general, the concept of a referent, in some embodiments, may be broad enough to correspond to anything referred to in a story, such that a user may add a referent of a user-defined referent type to story server 120 even if the referent is not of a referent type previously included in story data store 112.

Figure 5:
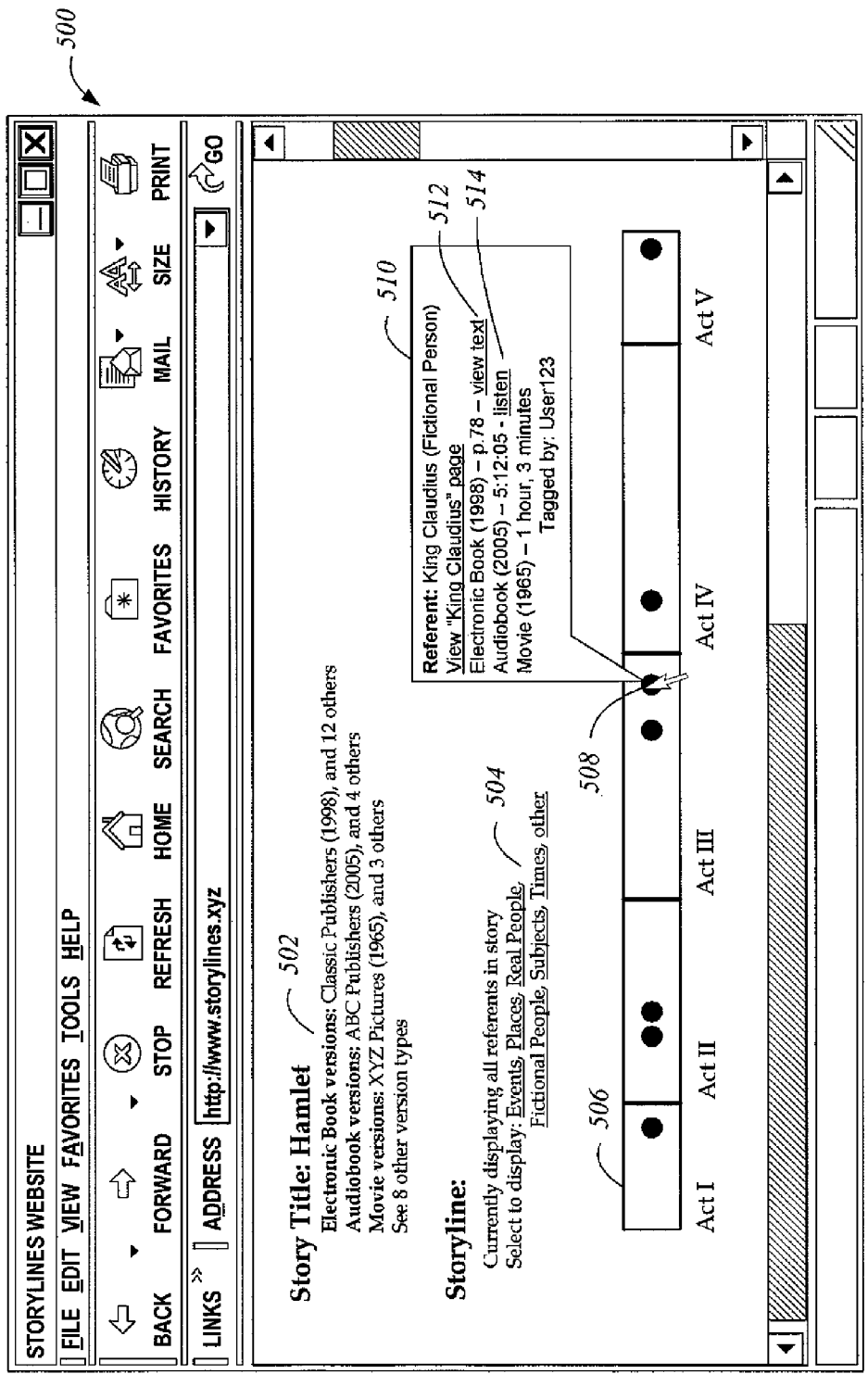
FIG. 5 is an illustrative user interface generated by the story server that displays a graphical representation of a storyline and information associated with a referent referred to by the story.

FIG. 5 is an illustrative user interface 500 generated by the story server 120 that displays a graphical representation of a storyline 506 and information 510 associated with a referent referenced by the story at point 508. As shown, the user interface 500 is displayed via a browser operating upon a computing device, such as computing device 102, utilized by a user. As illustrated, user interface 500 includes story version information 502 for the "Hamlet" story. Story version information 502 includes the three versions previously discussed in reference to FIG. 3 above (an electronic book version by Classic Publishers, an audio book version by ABC Publishers, and a movie version by XYZ Pictures). Story version information 502 additionally includes a listing of the number of other versions available, including twelve other electronic book versions, four other audio book versions, three other movie versions, and eight versions of other types. A user may select the listing of versions available in order to be presented with one or more additional user interfaces that include identification information for the additional versions not displayed in user interface 500.

Storyline representation 506 includes a number of point representations, such as point 508, each of which may display referent information associated with the given point when the point representation is selected by the user. As noted in storyline display options 504, storyline representation 506 as illustrated displays all referents that have been associated with points in at least one version of Hamlet, such as an electronic book version. The user may select one of options 504 in order to filter the referents displayed in storyline 506 based on referent type, such as filtering the display to only show points that are associated with an event referent, a place referent, a real person referent, a fictional person referent, a subject referent, a time referent, or referents of other types than those listed in options 504.

Each of the points shown in storyline 506 may be associated with referent information, similar to referent information 510 that is associated with point 508. Referent information 510 corresponds to fictional person referent "King Claudius," and includes selectable text "View 'King Claudius' page" that may be selected by the user in order to view a user interface including details regarding the referent, e.g., a "referent detail page," for the King Claudius referent. An example of a referent detail page is discussed below in reference to FIG. 7. Referent information 510 additionally includes a listing of points in specific versions of Hamlet for which the "King Claudius" referent has been associated or "tagged" by a user identified by user name "User123." The user identified as "User123" may have associated the King Claudius referent with point 508 in one version of Hamlet by selecting options in a user interface similar to that described below in reference to FIG. 6. The story server 120 may have then automatically associated the King Claudius referent with other versions of Hamlet via position mapping, as described above. As illustrated in user interface 500, the user may select "view text" option 512 in order to view a portion of electronic book content, such as text and/or image data, corresponding to point 508 in storyline 506. For example, selection of the "view text" option 512 may result in the story server 120 generating for display one or more user interfaces that include a portion of book content retrieved from story data store 112 that includes an implicit or explicit reference to a character named "King Claudius." Similarly, selection of "listen" option 514 may enable a user to listen to a portion of a narrated audio recording of the Hamlet story that references a character named "King Claudius," which may be retrieved from story data store 112 or another data store.

Figure 6:
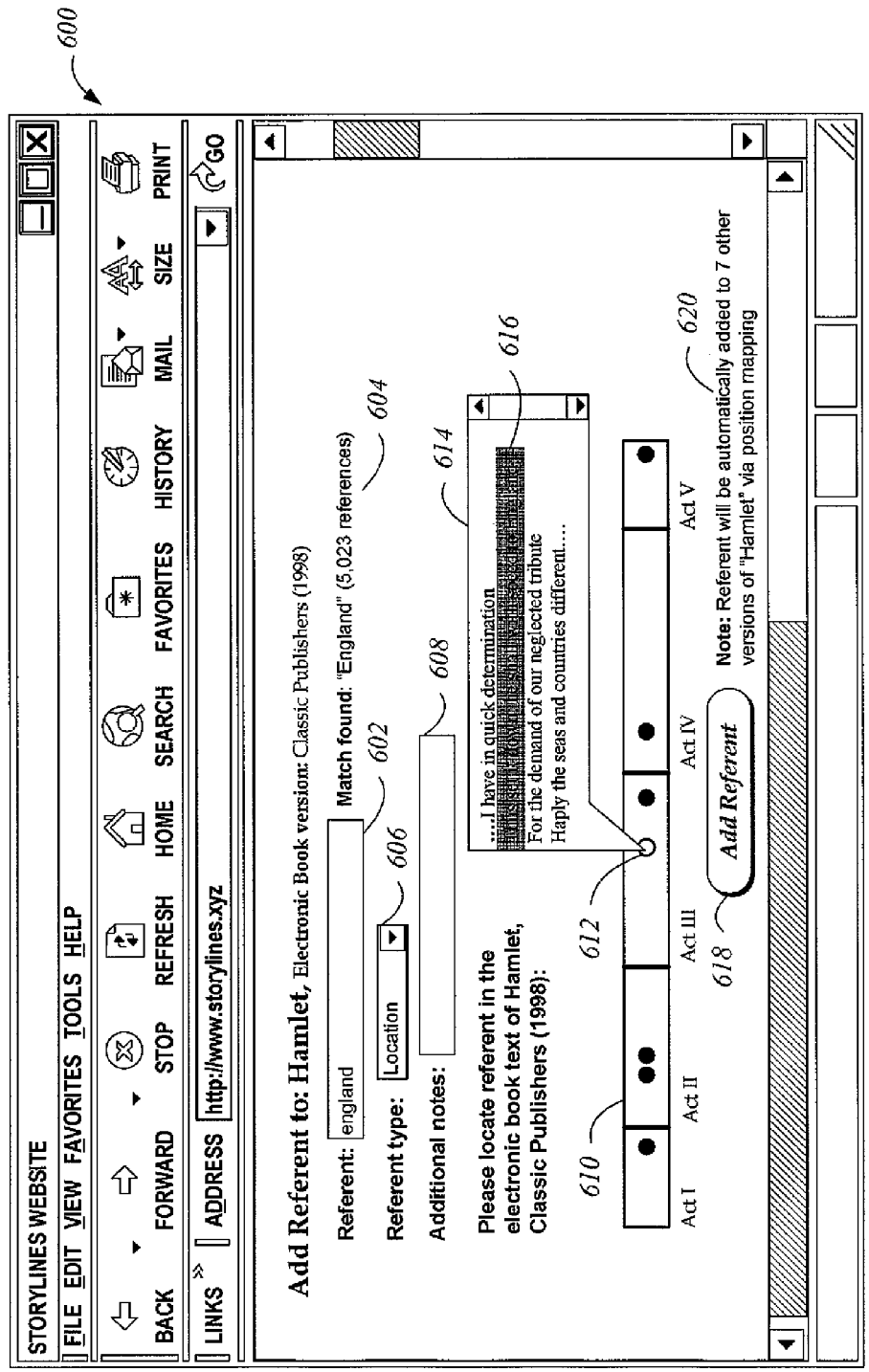
FIG. 6 is an illustrative user interface generated by the story server that enables a user to associate a referent with a story that references the referent.

FIG. 6 is an illustrative user interface 600 generated by the story server 120 that enables a user to associate a referent with a story that references the referent. User interface 600 may be presented to a user, for example, after the user has selected an option to associate a referent with the electronic book version of Hamlet published by Classic Publishers in 1998. User interface 600 includes a referent name field in which the user has typed "england," and which the story server 120 has found a matching referent, named "England," in story data store 112, as indicated by text 604. Text 604 additionally indicates that the "England" referent has previously been associated with 5,023 points in other stories. While the user has entered text in field 602 that matches a referent that is already included in story data store 112, in some embodiments, a user may add a reference in a story to a referent that does not match any previously existing referents in story data store 112, such that the total number of different referents in story data store 112 may increase as users add additional referents. As illustrated, the user has selected the referent type "Location" (which may be referred to as "Place" in some embodiments) from referent type option 606. User interface 600 also includes an additional notes field 608 in which the user may type notes related to the referent and/or the point in the story that the user is requesting that the story server associate with the referent.

Illustrative user interface 600 includes a representation of a storyline 610 associated with the electronic book version of Hamlet published by Classic Publishers. In some embodiments, the user may select any portion of storyline 610 in order to view scrollable text, such as text 614, corresponding to the given portion of the text content of the electronic book, which may be retrieved by the story server 120 from story data store 112. In other embodiments, the story server 120 may automatically present the user with a given portion of the content of the electronic book based on matches found in the text for the referent name typed by the user in referent name field 602. For example, the story server may search the text of the electronic book for an occurrence of the word "England," and then present the user with the text surrounding any occurrence found in order for the user to verify that the given point in the electronic book should be associated with the "England" referent. As shown in text 614, the user has highlighted or selected a portion 616 of the displayed text that reads "Thus set it down: he shall with speed to England." The user may select "add referent" option 618, which may result in the story server associating the "England" referent with the content portion 616 that occurs at point 612 in storyline 610. As noted in text 620, the story server may automatically associate the "England" referent with other versions of Hamlet based on one or more position maps that associate point 612 in storyline 610 with corresponding points in other versions of the story. While certain selectable options that enable a user to add a referent to a story have been discussed above, the story server may enable a user to create associations between stories and referents using various drag and drop tools, menus, key strokes, and/or other input controls not illustrated.

Figure 7:
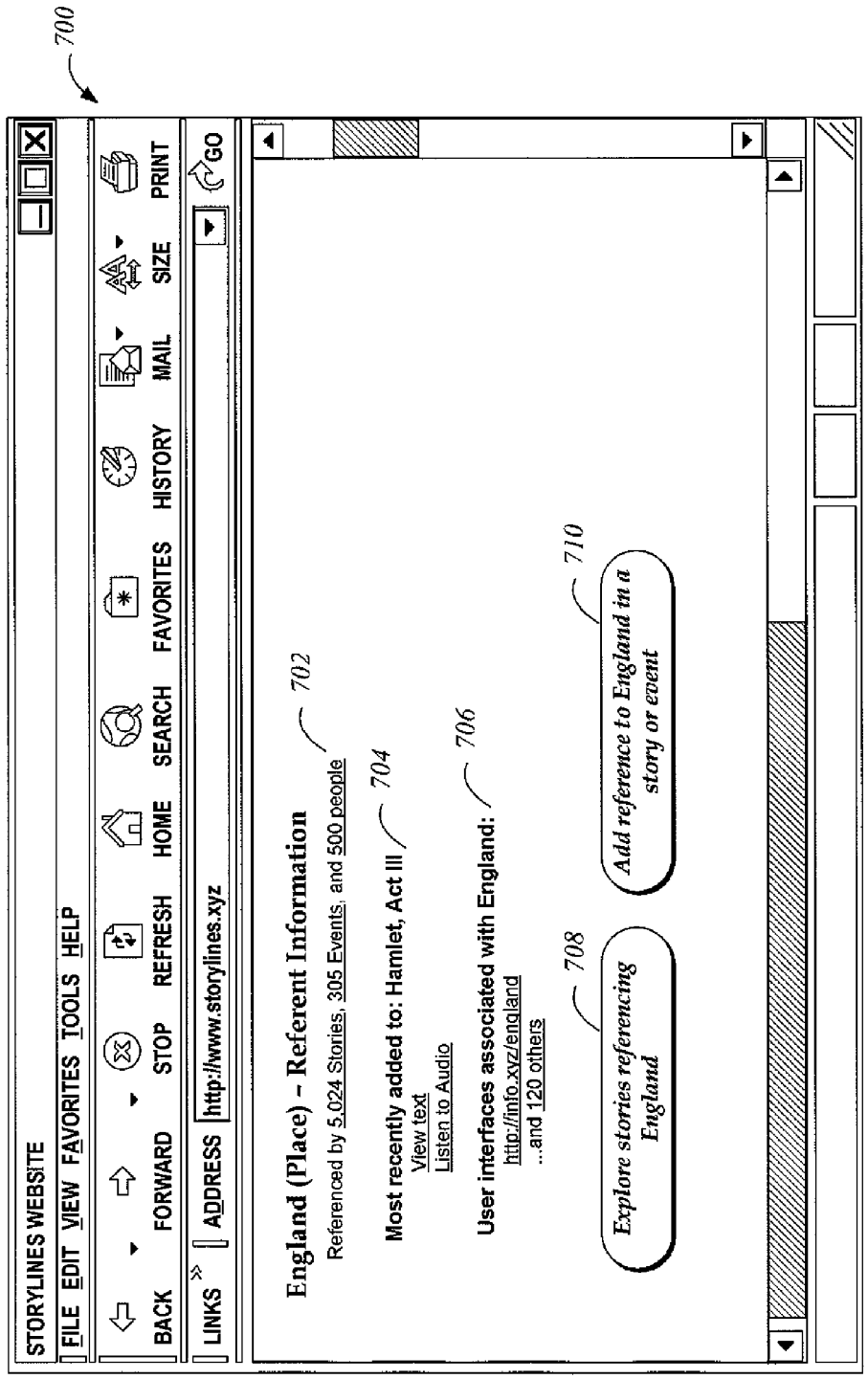
FIG. 7 is an illustrative user interface generated by the story server that displays information associated with a referent.

FIG. 7 is an illustrative user interface 700 generated by the story server 120 that displays information associated with place referent "England." In some embodiments, user interface 700 may be considered an example of a "referent detail page," and a similarly formatted user interface may be generated whenever a user selects to view information related to any referent of interest to the user that has information stored in story data store 112. User interface 700 may be presented to a user, for example, after the user has viewed a storyline for a story that references England, and the user has selected to view more information about England and/or wishes to discover other stories that reference England. User interface 700 includes a selectable listing 702 of other stories, events and people that reference the "England" referent. The user may select in text 702 the option "5,024 stories" that reference England, for example, in order to be presented with one or more user interfaces generated by story server 120 that include identification information identifying all or a subset of the stories that have been associated with the England referent, storyline representations for such stories, portions of content from such stories that include references to England, and/or other information associated with one or more of the associated stories. One or more similar interfaces may be displayed if the user selects option 708, "Explore stories referencing England."

Illustrative user interface 700 also includes text 704 that indicates the story most recently associated with the England referent. As indicated in text 704, a user may have most recently associated the England referent with the Hamlet story at a point in Act III of the story. Text 704 includes selectable options to view text or listen to audio corresponding to the point or portion in the Hamlet story that is associated with the England referent. The result of selecting the text or audio options in text 704 may be similar to the results of selecting similar options in FIG. 5, discussed above. User interface 700 additionally includes text 706 that lists user interfaces or pages associated with England. The user may select the identification information for a user interface listed in text 706 in order to view one or more user interfaces that have been associated with the England referent by one or more users. For example, such user interfaces may include user-generated content, educational or historical information, images, maps, video, and/or other information related to the topic of England, and may be local to story server 120 or remote to story server 120. User interface 700 also includes option 710, which the user may select to be presented with a user interface that enables the user to associate the England referent with a story or event, which may be similar to the user interface discussed below in referent to FIG. 8.

Figure 8:
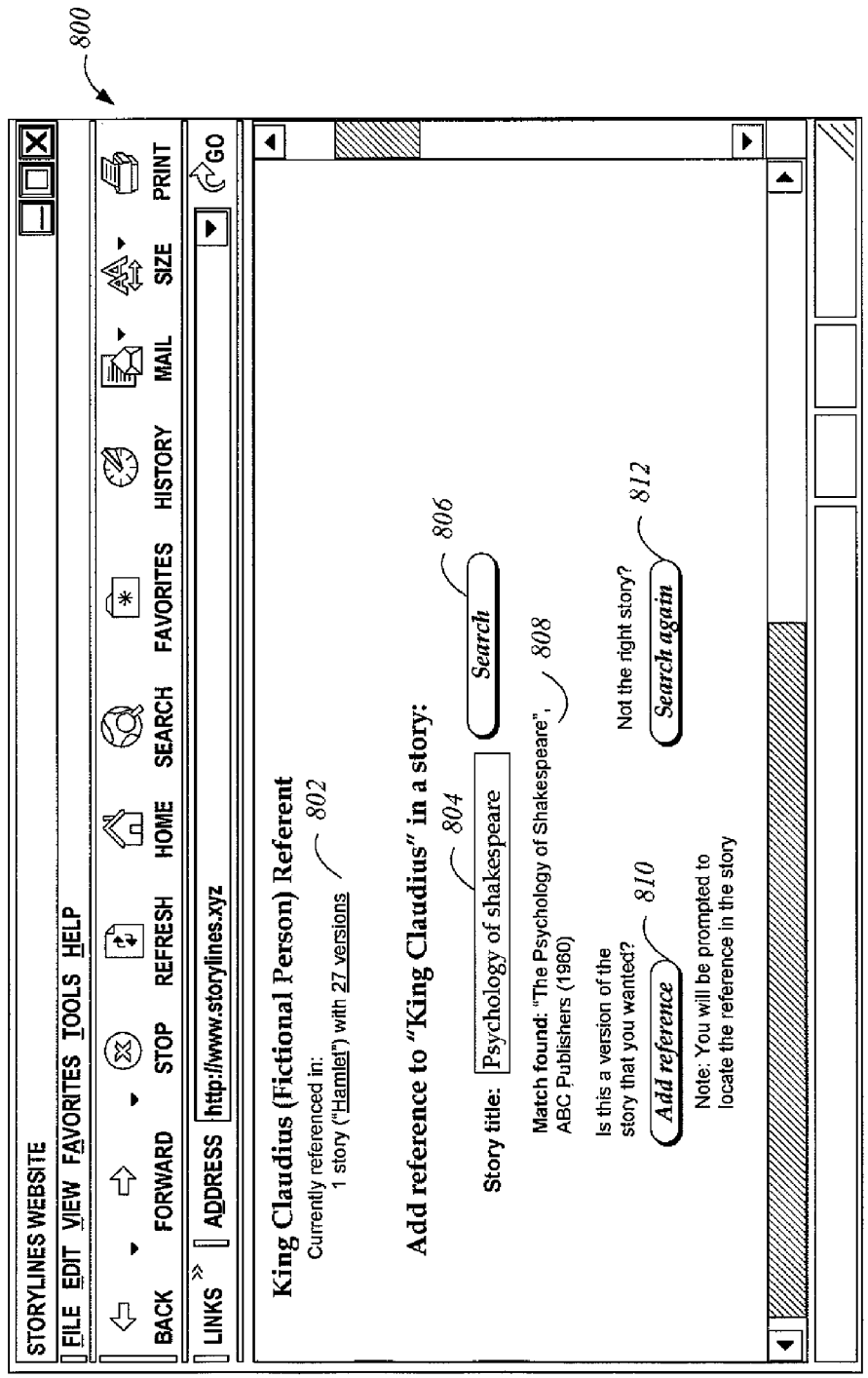
FIG. 8 is an illustrative user interface generated by the story server that enables a user to identify a story and associate a referent with the identified story.

FIG. 8 is an illustrative user interface 800 generated by the story server 120 that enables a user to identify a story and associate a referent with the identified story. User interface 800 may be presented for display after a user has selected to associate a given referent, in this case the "King Claudius" fictional person referent, with a story. As indicated by text 802, the "King Claudius" referent is currently associated with twenty-seven versions of the Hamlet story. User interface 800 includes field 804 in which the user has typed "Psychology of shakespeare." Field 804 may generally enable the user to type a title or portion of a title of a story with which the user would like to associate the King Claudius referent. The user may have then selected search option 806 to indicate to the story server 120 that the story with which the user would like to associate the King Claudius referent contains the words "Psychology of shakespeare" in its title. As indicated by text 808, the story server has found a matching story or version of a story with information stored in story data store 112. The match is indicated as "The Psychology of Shakespeare," published by ABC Publishers in 1960. If this is the story that the user searched for, the user may select option 810 in order to view an additional user interface that includes options for locating a point in the "The Psychology of Shakespeare" story that should be associated with the King Claudius referent, which may include user interface portions similar to the user interface discussed above in reference to FIG. 6. If "The Psychology of Shakespeare," published by ABC Publishers in 1960, is not the story that the user intended to associate with the King Claudius referent, the user may select option 812 in order to perform a different search or view additional search results.

As discussed throughout the present disclosure, the above methods may enable users to create associations between stories and referents, and to explore relationships between stories and/or referents based on these associations. In some embodiments, for example, a user may read a book that the user enjoyed because of a certain character, a certain time period, or some other referent discussed in the narrative of the story. Aspects of the present disclosure may then enable the user to view other stories associated with the referent of interest to the user. From there, the user may explore other referents associated with the additional stories, learn more about the subject matter of the referents of interest to the user, and/or explore other associations between various referents and/or stories.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for displaying relationships between two or more stories, the system comprising:
   a data store that stores data associated with a plurality of stories; and
   a computing device in communication with the data store and that is configured to:
      cause display of: (1) identification information identifying a first story, wherein the first story is embodied in at least a first type of media, and (2) a plurality of referents that are each related to a point in the first story, wherein each of the plurality of referents comprises at least one of an event, a character, an object, a subject, a time, a place and a person;
      enable a user to filter the plurality of referents that are displayed based at least in part on a referent type associated with each of the plurality of referents;
      enable a user to select one of the plurality of referents related to a given point in the first story in order to view identification information identifying at least one other story that is also associated with the selected referent; and
      based at least in part on a user selection of one of the plurality of referents:
         determine a second story that is associated with the selected referent, wherein the second story is different from the first story and is embodied in at least the same first type of media as the first story, wherein the second story is determined based at least in part on stored referent association data that associates the second story with a plurality of referents; and
         cause display of (1) identification information identifying the second story that is associated with the selected referent, and (2) a graphical representation comprising a plurality of indicia, wherein each indicium of the plurality of indicia represents a different point that is in the second story and that is related to the selected referent, wherein each indicium of the plurality of indicia is included in the graphical representation in a narrative order in which the point represented by the indicium occurs in the second story.

2. A system for displaying relationships between two or more stories, the system comprising:
   a data store that stores data associated with a plurality of stories; and
   a computing device in communication with the data store and that is configured to:
      cause display of: (1) identification information identifying a first story, wherein the first story is embodied in at least a first type of media, and (2) a plurality of referents that are each related to a point in the first story, wherein each of the plurality of referents comprises at least one of an event, a character, an object, a subject, a time, a place and a person;
      enable a user to select one of the plurality of referents related to a given point in the first story in order to view identification information identifying at least one other story, that is also associated with the selected referent; and
      based at least in part on a user selection of one of the plurality of referents:
         determine a second story that is associated with the selected referent, wherein the second story is different from the first story and is embodied in at least the same first type of media as the first story, wherein the second story is determined based at least in part on stored referent association data that associates the second story with a plurality of referents; and
         cause display of (1) identification information identifying the second story that is associated with the selected referent, and (2) a graphical representation comprising a plurality of indicia, wherein each indicium of the plurality of indicia represents a different point that is in the second story and that is related to the selected referent, wherein each indicium of the plurality of indicia is included in the graphical representation in a narrative order in which the point represented by the indicium occurs in the second story.

3. The system of claim 2, wherein the first type of media comprises at least one of a book, an audio book, an electronic book, an image, and a movie.

4. The system of claim 2, wherein the at least one other story is associated with the selected referent by the selected referent being referenced in content of the at least one other story.

5. The system of claim 4, wherein the content of the at least one other story comprises at least one of text data, audio data, image data and video data.

6. The system of claim 2, wherein the computing device is further operative to cause display of identification information identifying a plurality of other stories, wherein each of the plurality of other stories is associated with the selected referent.

7. The system of claim 2, wherein the computing device is further operative to, in response to user selection of one of the plurality of referents, cause display of a point in at least one other version of the first story that is related to the selected referent.

8. A non-transitory computer-readable medium storing computer executable instructions that, when executed by one or more computing devices, configure the one or more computing devices to perform operations comprising:
    causing display of a plurality of referents that are each related to a first story, wherein the first story is embodied in at least a first type of media;
    enabling a user to select one of the plurality of referents related to at least one point in the first story in order to view identification information identifying at least one other story that is also associated with the selected referent; and
    based at least in part on a user selection of one of the plurality of referents:
        determining a second story that is associated with the selected referent, wherein the second story is different from the first story and is embodied in at least the same first type of media as the first story, wherein the second story is determined based at least in part on referent association data that associates the second story with a plurality of referents; and
        causing display of a graphical representation comprising a plurality of indicia, wherein each indicium of the plurality of indicia represents a different point that is in the second story and that is associated with the selected referent, wherein each indicium of the plurality of indicia is included in the graphical representation in a narrative order in which the point represented by the indicium occurs in the second story.

9. The non-transitory computer-readable medium of claim 8, wherein each of the plurality of referents comprises at least one of an event, a character, an object, a subject, a time, a place and a person.

10. The non-transitory computer-readable medium of claim 8, wherein at least one of the plurality of referents comprises a user-defined referent type.

11. The non-transitory computer-readable medium of claim 8, wherein each indicium of the plurality of indicia indicates that the selected referent is referenced in content of the second story at a point represented by the indicium.

12. The non-transitory computer-readable medium of claim 8, wherein points in the second story that are related to the selected referent are determined based at least in part on a point map that relates each of a plurality of points in the first story with a point in the second story.

13. The non-transitory computer-readable medium of claim 8, wherein content of the second story comprises at least one of text data, audio data, image data and video data.

14. The non-transitory computer-readable medium of claim 8, wherein the first story and the second story are each associated with one or more story versions.

15. The non-transitory computer-readable medium of claim 14, wherein each story version comprises one of a book, an audio book, an electronic book, and a movie.

16. The non-transitory computer-readable medium of claim 8, wherein the operations further comprise enabling a user to filter the plurality of referents that are displayed based at least in part on a referent type associated with each of the plurality of referents.

17. A computer-implemented method for displaying content, the computer-implemented method comprising:
    as implemented by one or more computing devices configured with specific executable instructions,
        causing display of a visual representation of a first story, wherein the first story is embodied in at least a first type of media, wherein the visual representation of the first story comprises a plurality of points that are each associated with at least one of a plurality of referents referenced within content of the first story, each of the plurality of referents comprising at least one of an event, a character, an object, a subject, a time, a place and a person;
        enabling a user to select one of the plurality of points in the visual representation of the first story that is associated with a given referent;
        identifying a plurality of points, in a second story, that are related to the given referent, wherein the second story is different from the first story and is embodied in at least the same first type of media as the first story; and
    based at least in part on a user selection of the one of the plurality of points in the visual representation of the first story, causing display of a graphical representation comprising a plurality of indicia, wherein each indicium of the plurality of indicia represents a different point that is in the second story and that is related to the given referent, wherein each indicium of the plurality of indicia is included in the graphical representation in a narrative order in which the point represented by the indicium occurs in the second story.

18. The computer-implemented method of claim 17, wherein content of the second story comprises at least one of text data, audio data, image data and video data.

19. The computer-implemented method of claim 17, wherein the first type of media comprises at least one of a book, an audio book, an electronic book, and a movie.

20. The computer-implemented method of claim 17, wherein identifying the plurality of points in the second story comprises identifying a plurality of portions of content of the second story in which the given referent is referenced.

21. The computer-implemented method of claim 17, wherein the visual representation does not include textual content of the first story other than referent identification information.

* * * * *